United States Patent [19]

Shiraishi

[11] Patent Number: 5,148,531

[45] Date of Patent: Sep. 15, 1992

[54] SYSTEM FOR EXECUTING A CONDITIONAL STATEMENT WITHOUT READING PROGRAM DATA PART THAT DOES NOT SATISFY THE CONDITIONAL CLAUSE

[75] Inventor: Naoki Shiraishi, Nara, Japan

[73] Assignee: Sharp Kabushiki Kaisha, Osaka, Japan

[21] Appl. No.: 331,650

[22] Filed: Mar. 31, 1989

[30] Foreign Application Priority Data

Mar. 31, 1988 [JP] Japan .................. 63-81994
Apr. 14, 1988 [JP] Japan .................. 63-92105

[51] Int. Cl.⁵ .................. G06F 9/06; G06F 9/22; G06F 9/305
[52] U.S. Cl. .................. 395/375; 364/259.6; 364/261.5; 364/262.8; 364/DIG. 1
[58] Field of Search ... 364/200 MS File, 900 MS File; 395/375

[56] References Cited

U.S. PATENT DOCUMENTS

| | | | |
|---|---|---|---|
| 4,289,559 | 9/1981 | Easley et al. | 364/200 |
| 4,654,786 | 3/1987 | Cochran et al. | 364/200 |
| 4,821,183 | 4/1989 | Hauris | 364/200 |

Primary Examiner—Thomas C. Lee
Assistant Examiner—Ayni Mohamed

[57] ABSTRACT

A computer comprising a jump means for changing the address of an addressing means so as to skip the addresses storing program data (such as THEN or ELSE) which are not to be executed when a conditional statement (such as IF) is executed. Thereby, the execution of an conditional statement is rapidly conducted.

6 Claims, 7 Drawing Sheets

FIG. 9
PRIOR ART

| | 00 | 01 | 02 | 03 | 04 | 05 | 06 | 07 | 08 | 09 | 0a | 0b | 0c | 0d | 0e | 0f | 10 | 11 | 12 | 13 | 14 | 15 |
|---|---|---|---|---|---|---|---|---|---|---|---|---|---|---|---|---|---|---|---|---|---|---|
| a | I | F | A | = | | 1 | | T | H | E | N | | B | | = | 1 | 0 | E | L | S | E | C | = | | 2 | 0 | OD |
| b | IF | | A | = | | 1 | THEN | B | | = | | 1 | 0 | ELSE | C | = | | 2 | 0 | OD | | |

SYSTEM FOR EXECUTING A CONDITIONAL STATEMENT WITHOUT READING PROGRAM DATA PART THAT DOES NOT SATISFY THE CONDITIONAL CLAUSE

BACKGROUND OF THE INVENTION

1. Field of The Invention

This invention relates to a computer, and more particularly, to a so-called stored program computer in which conditional statements such as an IF statement can be executed effectively.

2. Description of the Prior Art

In a programming language such as BASIC for a so-called stored program or programmed computer, conditional statements (e.g., an IF statement) are used. An IF statement can be expressed in the form of "IF X THEN Y ELSE Z". When the IF statement is executed, it is judged whether the condition X is satisfied or not. If the condition X is satisfied, the THEN clause is executed (the process Y after the key word "THEN" is executed). If the condition X is not satisfied, the ELSE clause is executed (the process Z after the key word ELSE is executed). In other words, when the IF statement is executed, either the THEN clause or the ELSE clause is not executed.

With reference to FIG. 9, the execution of an IF statement in the prior art will be described more specifically. Column (a) in FIG. 9 shows program data of an IF statement entered through a key board into a memory of a computer. The symbol "OD" at address 15 designates a delimiter which separates this statement from the succeeding statement. Column (b) in FIG. 9 illustrates the program of column (a) converted into an intermediate language. First, it is judged whether the condition "A = 1" is satisfied or not. If the condition is satisfied, the program data for the THEN clause are read from the memory to execute the THEN clause (namely, the number "10" is substituted for the variable "B"). Then, the key word "ELSE" of the ELSE clause is read, and the computer judges that this clause is not to be executed. The program data "C", "=", "2" and "0" stored in the addresses following the address of the key word "ELSE" are sequentially read out to be skipped until the delimiter "OD" stored in address Oe is read.

If the condition is not satisfied, the key word "THEN" of the THEN clause is read, and the computer judges that this clause is not to be executed. The program data "B", "=", "1" and "0" stored in the addresses following the address of the key word "THEN" are sequentially read out to be skipped until the key word "ELSE" stored in address 09 is read. Thereafter, the ELSE clause stored in addresses 09 to 0d are executed to substitute the number "20" for the variable "C".

As described above, when a conditional statement is executed in a prior art computer, program data which are not necessary to be executed are read, resulting in wasting a substantial period of time.

SUMMARY OF THE INVENTION

The computer of this invention, which overcomes the above-discussed and numerous other disadvantages and deficiencies of the prior art, comprises an input means for entering program data which includes one or more conditional statements; a memory means for storing the program data, an addressing means for assigning one of the addresses of the memory means so that a program data stored in the assigned address can be read out, an executing means for executing the program data read out from the address assigned by the addressing means, a detecting means for detecting, when one of the conditional statements is executed, a clause of the conditional statement which is not to be executed and a jump means for making the addressing means change the assigned address to another address which is calculated using a predetermined value contained in the conditional statement.

In a preferred embodiment, the predetermined value is contained in the detected clause.

In a preferred embodiment, the predetermined value is stored at an address which succeeds the address of the key word of the detected clause.

In a preferred embodiment, the predetermined value is stored at an address which succeeds the address of the key word representing the conditional statement.

In a preferred embodiment, the predetermined value corresponds to a difference between the other address and an address at which the value is stored.

In a preferred embodiment, one or more conditional statements include the IF statement.

Thus, the invention described herein makes possible the objectives of (1) to provide a computer which can execute rapidly a conditional statement; (2) to provide a computer which can execute a conditional statement without wasting time; (3) to provide a computer in which there is no necessity of reading out program data which are not to be executed; and (4) to provide a computer which, when a conditional statement is executed, can immediately read out program data which is to be executed, without accessing program data which is not to be executed.

BRIEF DESCRIPTION OF THE DRAWINGS

This invention may be better understood and its numerous objects and advantages will become apparent to those skilled in the art by reference to the accompanying drawings as follows:

FIG. 9 shows schematically a program data stored in a prior art computer.

DESCRIPTION OF THE PREFERRED EMBODIMENTS

Figures 1, 2:
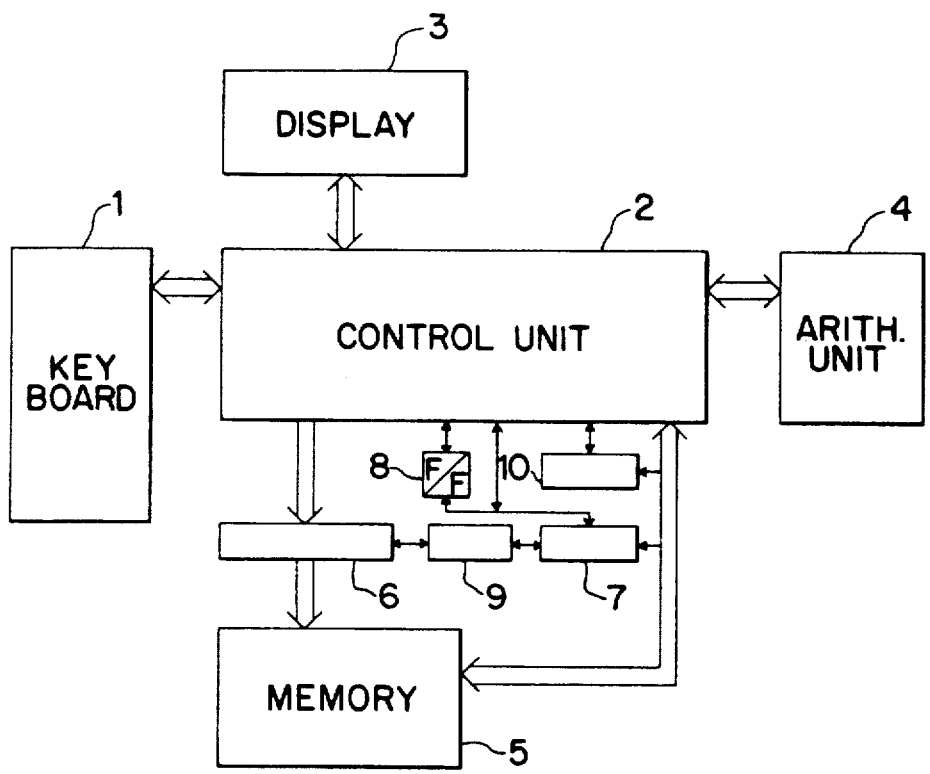
FIG. 1 is a block diagram of a computer according to the invention.
FIG. 2 shows schematically a program data stored in the computer of FIG. 1.

FIG. 1 illustrates diagrammatically a computer according to the invention. The computer of FIG. 1 comprises a key board 1 through which program data are entered, a control unit 2, a display unit 3 having an LCD, an arithmetic unit 4, and a memory 5 in which entered program data are written at and read out from addresses specified by an address controller or addressing means 6 under the control of the control unit 2. The entered program data are also sent to the display unit 3 to be displayed thereon.

The computer of FIG. 1 further comprises: an ELSE detection unit 7 for detecting the key word "ELSE" in the form of the intermediate language; a flip-flop circuit 8 for holding the output of the ELSE detection unit 7; a temporary memory unit 9 for storing a dummy code which will be described later; and a delimiter detection unit 10 for detecting a delimiter.

Figure 3:
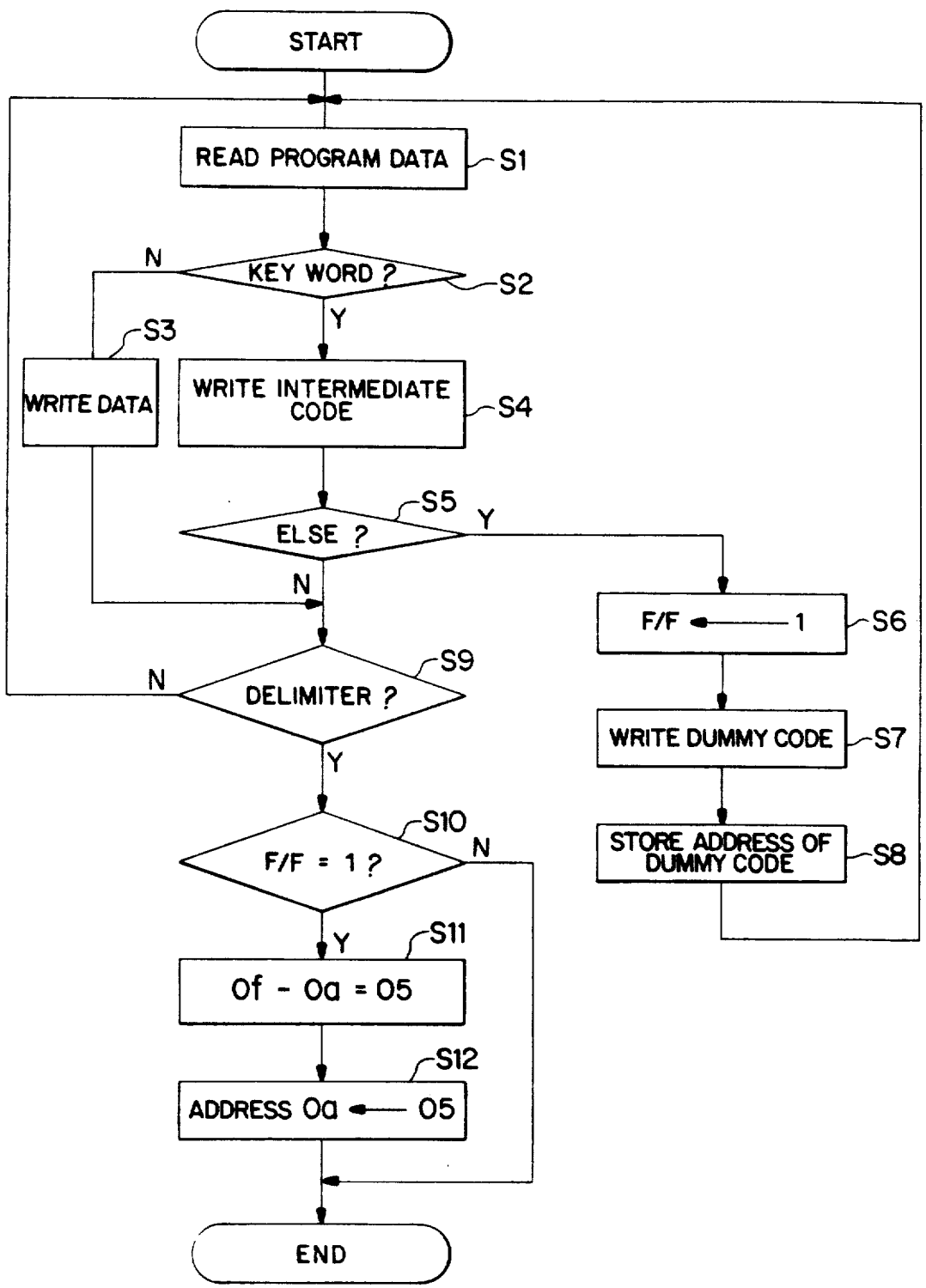
FIG. 3 is a flowchart illustrating the process of storing the program data of FIG. 2.

The process of storing the above-mentioned IF statement in the computer of FIG. 1 will be described with reference to FIGS. 2 and 3. Column (a) of FIG. 2, which is identical with column (a) of FIG. 9, shows the program data of the IF statement entered through the key board 1 and stored in the memory 5. After the delimiter "OD" is provided at address 15, the program data are read out to the control unit 2 under the control of the address controller 6 (step S1). After the key words ("IF", "THEN" and "ELSE") in the program data are converted into intermediate codes, the program data are returned to the memory 5 (step S4). The ELSE detection unit 7 detects the intermediate code of the key word "ELSE" included in the IF statement, and the flip-flop circuit 8 is set "1" (column (b), steps S5 and S6). When the key word "ELSE" is detected by the ELSE detection unit 7, the control unit 2 controls the address controller 6 so that the address assigned by the controller proceeds to the address 0a which succeeds the address 09 of the intermediate code of "ELSE", and a dummy code "00" is temporarily stored at the address 0a (column c, step S7). The address 0a is temporarily stored in the temporary memory unit (step S8).

The steps S1 to S8 are repeated until the delimiter detection unit 10 detects the delimiter "OD" (column d, step S9). When the delimiter is detected, the state of the flip-flop circuit 8 is checked to see whether the key word "ELSE" has been detected or not (step S10). When the key word "ELSE" has been detected, the arithmetic unit 4 calculates the difference (0f−0a=05) between the address 0f storing the delimiter "OD" and the address 0a stored in the temporary memory unit 9 (step S11), and the difference "05" replaces the dummy code "00", i.e., the difference "05" is written at the address 0a (column e, step S12).

Figure 4:
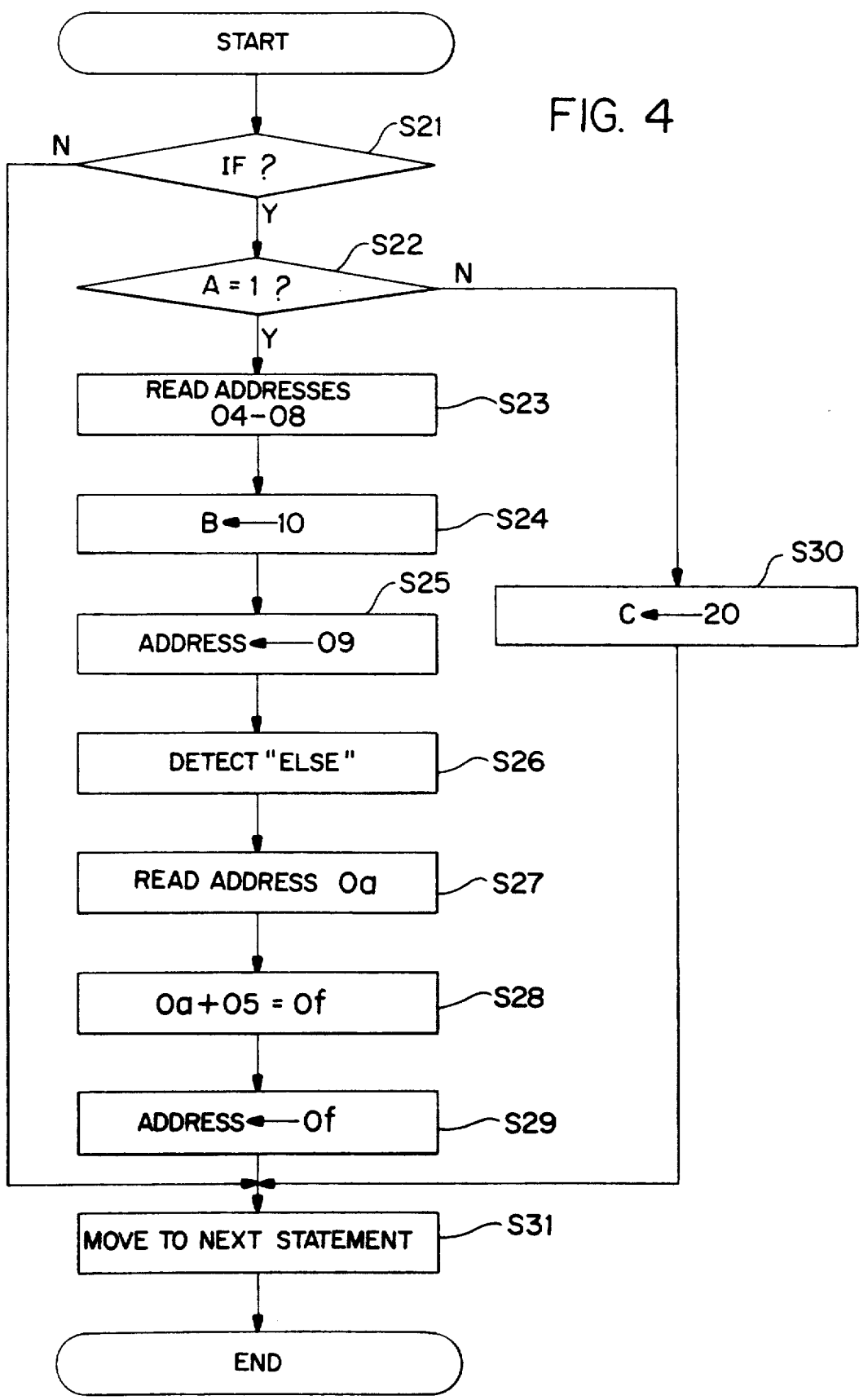
FIG. 4 is a flowchart illustrating the execution of the program data of FIG. 2.

Referring to FIG. 4, the execution of the thus stored IF statement in the computer of FIG. 1 will be described. When the IF statement is executed (step S21), it is judged whether the condition "A=1" is satisfied or not (step S22). If the condition is satisfied, the computer decides that the ELSE clause is not to be executed, and the THEN clause stored at addresses 04 to 08 is to be executed (steps S23 and S24). Thereafter, the address assigned by the address controller 6 proceeds to address 09 at which the intermediate code of the key word "ELSE" is stored (step S25). When the intermediate code of the key word "ELSE" is read out, the ELSE detection unit 7 detects it (step S26). The address information "05" is read out from address 0a following address 09 at which the intermediate code of the key word "ELSE" is stored (step S27). The address information (05) is added to the present address (address 0a) of the address controller 6 to conduct the addition of 0a+05=0f, thereby knowing the address at which the delimiter "OD" is stored (step S28). Then, the address controller 6 skips addresses 0b–0e to jump the assigned address to address 0f (step S29) so that the next statement stored addresses following address 0f is executed, thereby eliminating the reading of the program data which are not to be executed.

Figures 5, 6:
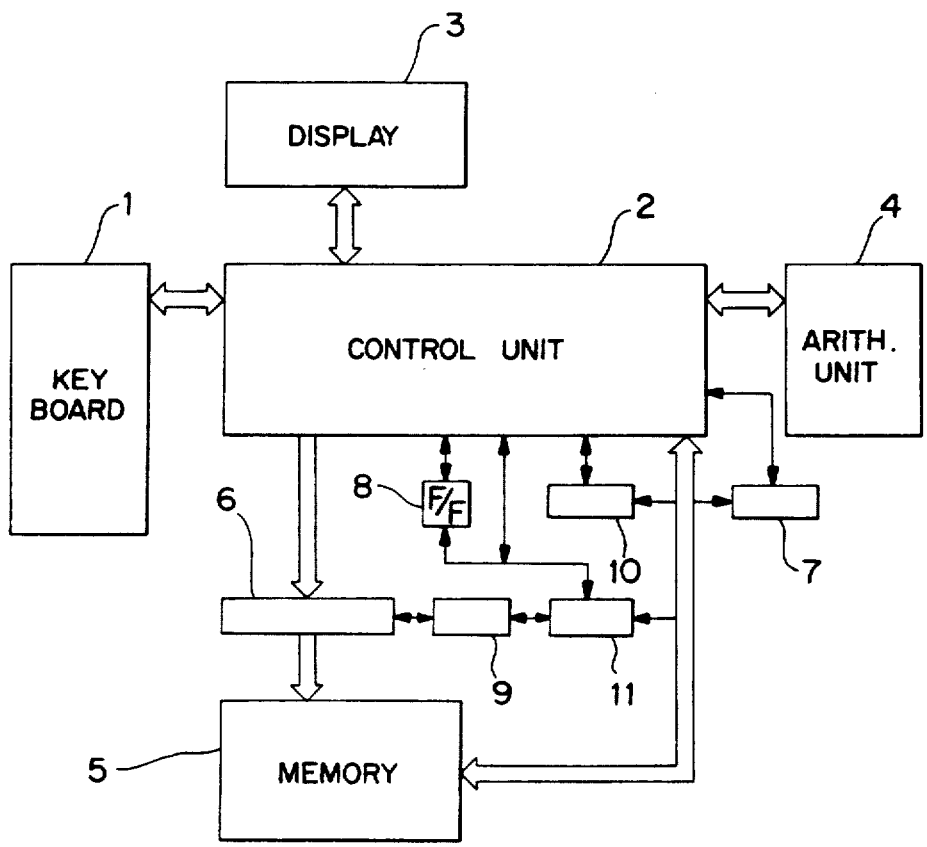
FIG. 5 is a block diagram of another computer according to the invention.
FIG. 6 shows schematically a program data stored in the computer of FIG. 5.

FIG. 5 shows another computer according to the invention. The computer of FIG. 5 has the same components as those of the computer of FIG. 1 except that the ELSE detection unit 7 is replaced with an If detection unit 11 and the ELSE detection unit 7 is directly connected to the control unit 2. The IF detection unit 11 detects the intermediate code of the key word "IF" in the IF statement.

Figure 7:
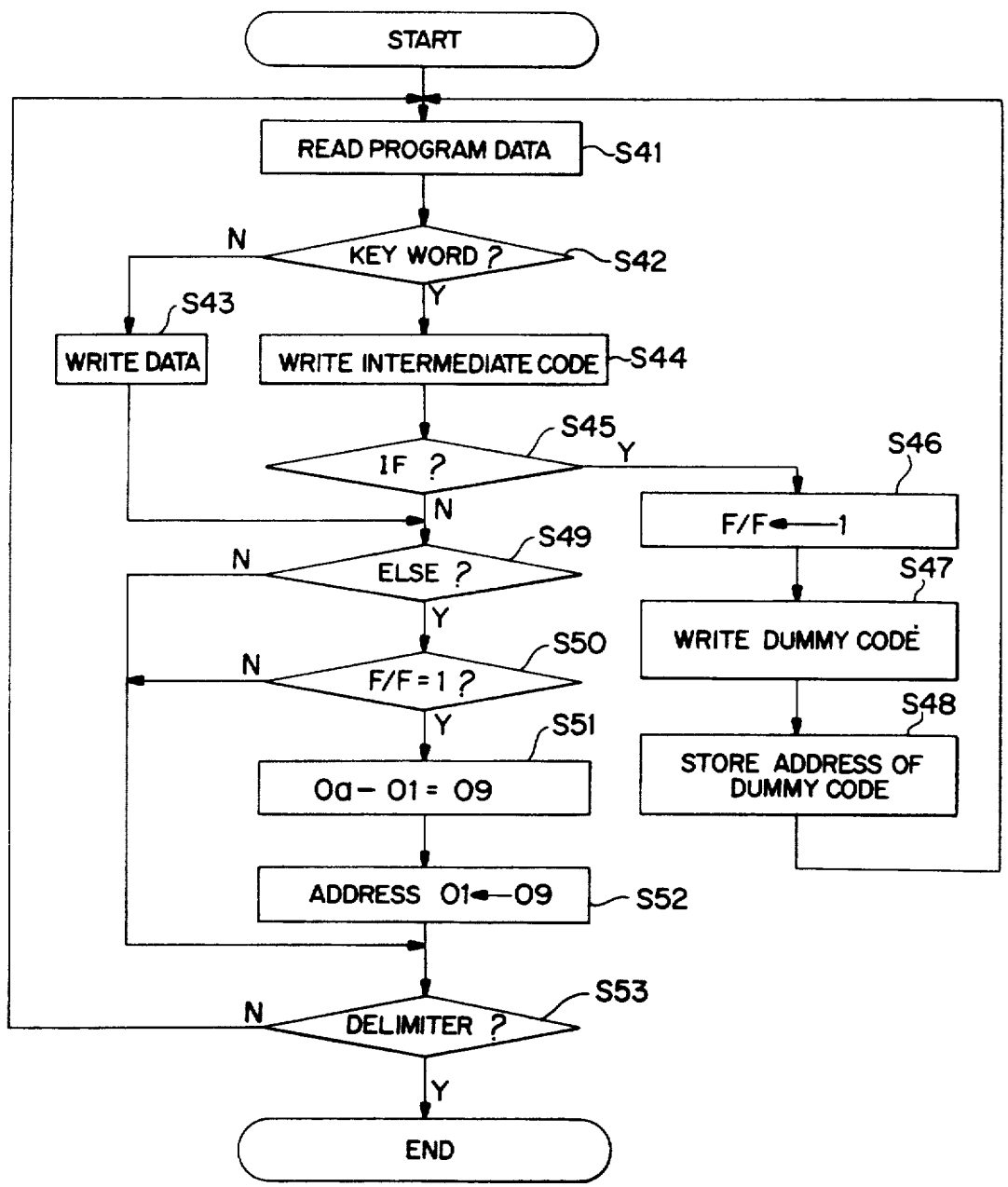
FIG. 7 is a flowchart illustrating the process of storing the program data of FIG. 6.

The process of storing the IF statement into the computer of FIG. 5 will be described with reference to FIGS. 6 and 7. The IF statement is stored in the same manner as described above (column (a), step S44). The key words are sequentially converted into intermediate codes. When the key word "IF" representing the IF statement is detected by the IF detection unit 11, and the flip-flop circuit 8 is set to "1" (column (b), steps S45 and S46). The address of the address controller 6 proceeds to the address 01 which succeeds the address 00 of the intermediate code of "IF", and an dummy code "00" is temporally stored at the address 01 (column (c), step S47). The address 01 is temporally stored in the temporary memory unit 9 (step S48). When the intermediate code of the key word "ELSE" is detected by the ELSE detection unit 7 (step S49), the state of the flip-flop circuit 8 is checked to see whether the key word "IF" has been detected or not (step S50).

When the key word "IF" has been detected, the arithmetic unit 4 calculates the difference (0a−01=09) between the address 0a storing the intermediate code of "ELSE" and the address 01 stored in the temporary memory unit 9 (step S51), and the difference "09" replaces the dummy code "00" (i.e., the difference "09" is written at address 01) (column (e), step S52). The steps S41 to S52 are repeated until the delimiter detection unit 10 detects the delimiter "OD" (column (f), step S53).

Figure 8:
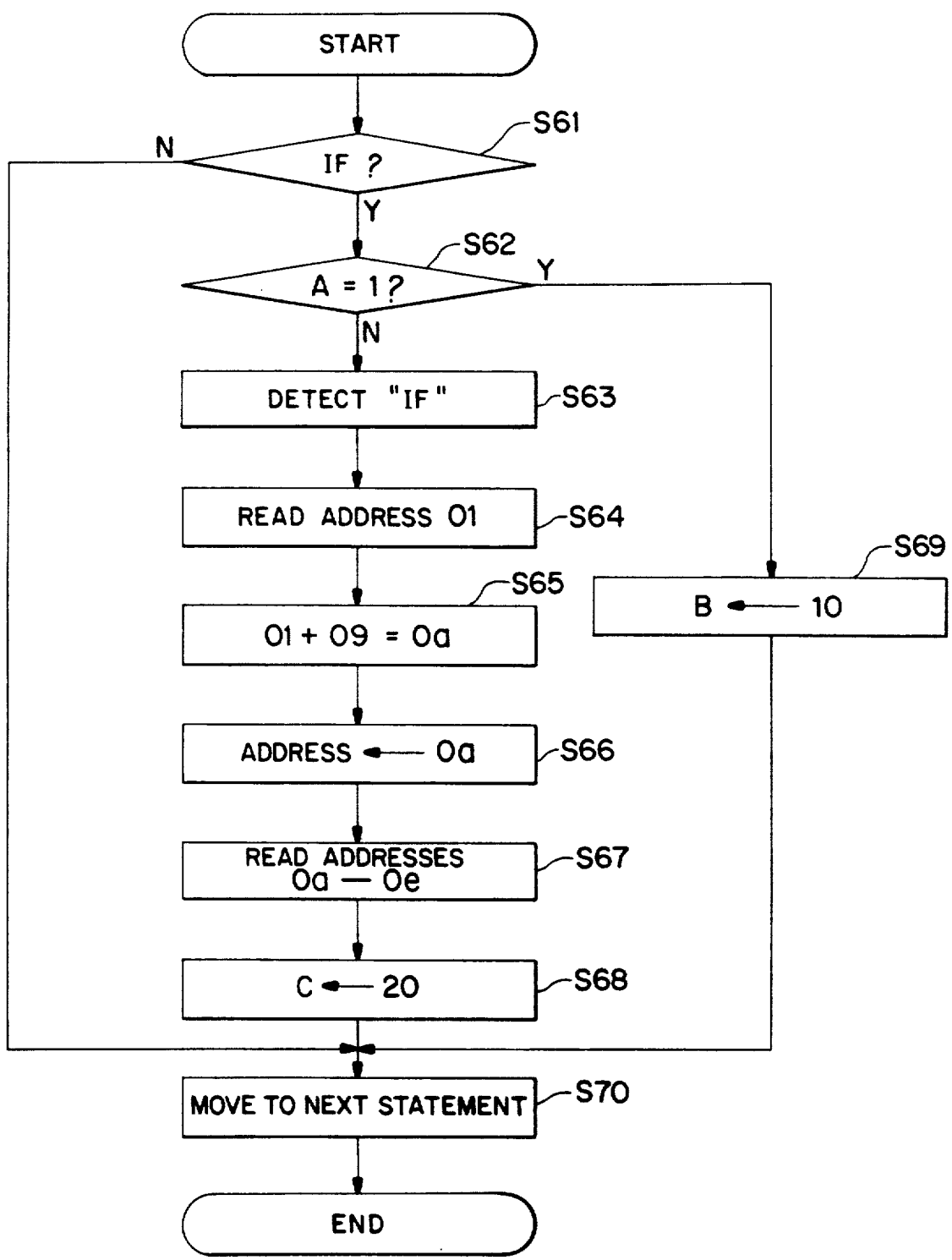
FIG. 8 is a flowchart illustrating the execution of the program data of FIG. 6.

FIG. 8 illustrates the execution of the IF statement in the computer of FIG. 5. When the IF statement is executed (step S61), it is judged whether the condition "A=1" is satisfied or not (step S62). If the condition is not satisfied, the computer decides that the THEN clause is not to be executed but the ELSE clause is to be executed (step S63). Then, the address information "09" is read out from address 01 following address 00 at which the intermediate code of the key word "IF" is stored (step S64). The address information (09) is added to the present address (address 01) of the address controller 6 to conduct the addition of 01+09=0a, thereby knowing the address at which the intermediate code of the key word "ELSE" is stored (step S65). The address assigned by the address controller 6 skips addresses 02–09 to jump to address 0a at which the intermediate code of the key word "ELSE" is stored so that the ELSE clause is executed (steps S67 and S68), thereby eliminating the reading of the program data (the THEN clause) which are not to be executed.

From the above description, it will be easily understood for those skilled in the art that the structures of the above-described two examples are combined so that in the resulting computer the jump of the address can be conducted in both the cases that the condition is satisfied and that the condition is not satisfied.

In the above-described examples, an IF statement is used as a conditional statement. However, it is apparent that the present is also applicable to a computer system in which other conditional statements are to be executed.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A stored program computer comprising:
   input means for entering program data which includes one or more conditional statements, said one or more conditional statement each including a conditional clause, a first clause which is to be executed based upon satisfaction of said conditional clause, and a second clause which is to be executed based upon nonsatisfaction of said conditional clause;
   memory means for storing said program data;
   addressing means for assigning an address of said memory means so that program data stored in said assigned address is read out;
   executing means for executing the program data read out from the address assigned by said addressing means;
   detecting means for detecting when a conditional statement is to be executed and for detecting which clause within said conditional statement is not to be executed, said detected clause including a key word; and
   jump means for controlling said addressing means to change the assigned address to another address, when said detecting means has detected the clause which is not to be executed, said another address being calculated using a predetermined value contained in said conditional statement.

2. The computer according to claim 1, wherein said predetermined value is contained in said detected clause.

3. The computer according to claim 2, wherein said predetermined value is stored at an address which succeeds an address of the key word of said detected clause.

4. The computer according to claim 1, wherein said predetermined value is stored at an address which succeeds an address of a key word representing said conditional statement, said key word being included in said conditional statement.

5. The computer according to claim 1, wherein said predetermined value corresponds to a difference between said another address and an address at which said predetermined value is stored.

6. The computer according to claim 1, wherein said conditional statement is an IF statement.

* * * * *